United States Patent [19]

Paschke

[11] 4,035,342

[45] July 12, 1977

[54] COPOLYESTERS CONTAINING 2,2',6,6'-TETRAMETHYLBIPHENYL-4,4'-DICARBOXYLATE MOIETIES

[75] Inventor: Edward E. Paschke, Glen Ellyn, Ill.

[73] Assignee: Standard Oil Company (Indiana), Chicago, Ill.

[21] Appl. No.: 622,644

[22] Filed: Oct. 15, 1975

[51] Int. Cl.$^2$ .................................. C08G 63/18
[52] U.S. Cl. ........................................ 260/75 R
[58] Field of Search ............................ 260/75 R

[56] References Cited

U.S. PATENT DOCUMENTS 3,257,452   6/1966   LeBlanc ............... 260/75 R X

FOREIGN PATENT DOCUMENTS 48-43670   12/1973   Japan ................... 260/75 R

OTHER PUBLICATIONS

Nomura et al., Journ. Chem. Soc. (B), 1970 pp. 956–960.

*Primary Examiner*—Lucille M. Phynes
*Attorney, Agent, or Firm*—William C. Clarke; Arthur G. Gilkes; William T. McClain

[57] ABSTRACT

This invention relates to a new family of resins which are essentially linear copolyesters comprising units of a polyhydric alcohol component comprising at least one dihydric alcohol moiety and a dicarboxylate component wherein said dicarboxylate component comprises terephthalate moieties and 2,2',6,6'-tetramethylbiphenyl-4,4'-dicarboxylate moieties in a range of mole ratios of from 19:1 to 1:19.

8 Claims, No Drawings

COPOLYESTERS CONTAINING 2,2',6,6'-TETRAMETHYLBIPHENYL-4,4'-DICARBOXYLATE MOIETIES

BACKGROUND OF THE INVENTION

This invention relates to essentially linear polyesters comprising units of a dihydric alcohol and a dicarboxylate component comprising terephthalate moieties and 2,2',6,6'-tetramethylbiphenyl-4,4'-dicarboxylate moieties.

In commonly assigned application, Ser. No. 517,506, filed Oct. 24, 1974 (which is incorporated by reference), there is described a new class of polyphenylcarboxylic acids, including 2,2',6,6'-tetramethylbiphenyl-4,4'-dicarboxylic acid. As pointed out in the aforesaid application, polyesters of 2,2',6,6'-tetramethylbiphenyl-4,4'-dicarboxylic acid have a relatively high glass transition temperature. For example, homopolymeric poly(ethylene-2,2',6,6'-tetramethylbiphenyl-4,4'-dicarboxylate) has a glass transition temperature of 191° C and a molding temperature of about 240° C.

Polyesters based on terephthalic acid, particularly polyethylene terephthalate, have been used for the manufacture of fibers and films because of the many desirable properties of the polymer, such as high mechanical strength, low water absorption and resistance to many chemicals. Recently, there has been considerable interest in the use of polybutylene terephthalates in fiberglass molding compositions. In addition to the foregoing, there are indications that polyethylene terephthalate may be used in large volumes for the production of containers, particularly those suitable for packaging carbonated beverages and various other food products. For this use, the polyethylene terephthalate has the advantage of relatively low permeability to carbon dioxide, low water absorption and low permeability to various other products indigenous to foods.

As pointed out in U.S. Pat. No. 3,535,286, polyethylene terephthalate crystallizes too rapidly for some uses. While the undesirably high crystallization tendency can be reduced by replacing part of the terephthalic acid or the polyhydric alcohol, most of the potential replacement compounds do not substantially improve the undesirable properties of the polymer. Further, such compounds generally reduce the glass transition temperature of the polyalkylene terephthalates and reduce the utility of the polymer. Polyethylene terephthalate (PET) has a relatively high molding temperature of approximately 260°–270° C and a Tg (glass transition temperature or second order transition temperature) of about 75° C. The relatively low glass transition temperature of the polyester can lead to fusion of polyethylene terephthalate fibers in fabrics during home dryer use of ironing.

The relatively large gradient between the molding temperature of the polymer and the second order transition temperature of the polymer creates several problems in PET molding applications. For example, in the production of polyester bottles, polyethylene terephthalate must be molded at a temperature of about 275° C and then cooled down to about the second order transition temperature prior to orientation to form an oriented (biaxially or monoaxially oriented) bottle. It is generally recognized that the cooling period is the time limiting step in the production of oriented polyethylene bottles. Accordingly, there is a need for co-monomers which are capable of lowering the molding temperature of polyethylene terephthalate without adversely affecting the second order transition temperature of the PET polymer.

Although the crystals of a polymer melt over a temperature range, there is a temperature above which the crystals can not exist. This temperature is defined as the melting point. Molding temperature or fabrication temperature is defined as the temperature at which the polymer has sufficient flow to be converted to a shaped article. Typically, the molding temperature is higher than the melting point temperature. The second order transition temperature (or Tg) represents the temperature at which the polymer passes from the glassy form into the elastic form and vice versa. In the case of copolymerization, the molding temperature and Tg temperature generally decrease, and, in the cases where increases are demonstrated, such increases are generally small. Surprisingly, the inclusion of the 2,2',6,6'-tetramethylbiphenyl-4,4'-dicarboxylic acid as a comonomer in terephthalic acid polyester lowers the molding temperature and increases the Tg. The increased ease in processing PET as well as the economic advantage of lower melt temperatures, i.e., requiring less heat input to reach melt temperature, increases the economic utility of PET.

The object of this invention accordingly is to provide new terephthalate polyesters having a relatively low molding temperature without reduction of the second order transition temperature of the polymer. Another object of this invention is to provide polyalkyleneterephthalate polyesters having improved physical properties. Other objects appear hereinafter.

I have now found that essentially linear copolyesters comprising units of dihydric alcohol and a dicarboxylate component wherein said dicarboxylate component comprises terephthalate moieties and 2,2',6,6'-tetramethylbiphenyl-4,4'-dicarboxylate moieties have a lower molding temperature then homopolyester of dihydric alcohol and terephthalic acid and the resultant polyesters also have a higher second order transition temperature than the homopolymeric polyester. The polyesters of this invention can have a terephthalate to 2,2',6,6'-tetramethylbiphenyl-4,4'-dicarboxylate mole ratio range of from approximately 19:1 to 1:19. In general, as the concentration of 2,2',6,6'-tetramethylbiphenyl-4,4'-dicarboxylate moieties increase in the polymer, the Tg of the polymer increases. For example, polyester based on ethylene glycol having a 4:1 mole ratio of terephthalate moieties to tetramethylbiphenyl dicarboxylate moieties has a Tg of about 95° C, a 3:2 mole ratio has a Tg of about 119° C, a 2:3 mole ratio has a Tg of about 145° C and a 1:4 ratio has a Tg of about 169° C. As the concentration of terephthalate moieties to tetramethylbiphenyl dicarboxylate moieties decreases, the molding temperature of the polymer increases but is still lower than that of the homopolyester of ethylene glycol and terephthalic acid. For example, polyesters based on ethylene glycol having a 4:1 mole ratio of terephthalate to tetramethylbiphenyl dicarboxylate moieties have a molding temperature of about 140° C, at a 3:2 mole ratio the molding temperature is about 140° C, at a 2:3 mole ratio the molding temperature is about 185° C and at a 1:4 mole ratio the molding temperature is about 210° C. Molding temperature of poly(ethylene terephthalate) is approximately 260°–270° C.

While it is generally preferred that the two essential acyl monomers (terephthalic acid and 2,2',6,6'-tetramethylbiphenyl-4,4'-carboxylic acid) comprise from 95–100% of the acyl equivalents in the polyesters of this invention, these co-monomers can comprise as little as 75% of the acyl equivalents. Other suitable acid co-monomers include aromatic polycarboxylic acids, such as phthalic acid, phthalic anhydride, isophthalic acid, 2,6-naphthalene dicarboxylic acid, trimellitic anhydride, trimellitic acid, etc.; saturated aliphatic polycarboxylic acids, such as adipic acid, sebacic acid, 1, 2, 3, 4-butane-tetracarboxylic acid, etc.; unsaturated aliphatic dicarboxylic acids, such as maleic acid, maleic anhydride, fumaric acid, etc. In general, the organic acids or acyl compounds containing three or more acyl groups can comprise up to about 2% of the acyl equivalents in the polyester and the difunctional organic acids comprise at least 98%.

In those cases where an alpha, beta-ethylenically unsaturated acid compound (maleic anhydride, fumaric acid, etc.) is used, the resulting polyester can be dissolved in a monovinyl aromatic (styrene, vinyltoluene,etc.) and can be used in molding compositions in the same manner as other unsaturated polyesters.

The polyhydric alchols useful in this invention include alkylene glycols containing from about 2-12 carbon atoms, such as ethylene glycol, 1,3-propylene glycol, 1,2-propylene glycol, butylene glycol, hexamethylene glycol, dodecamethylene glycol, etc.; aromatic polyhydric alcohols, such as hydroquinone, resorcinol, Bisphenol A, etc.; cycloaliphatic glycols such as 1,4-dimethylol cyclohexane, dimethylol cycloaliphatic glycols such as 1,4-dimethylol cyclohexane, dimethylol cyclobutane, etc.; polyoxyalklene glycols, such as polyoxyethylene glycols, polyoxypropylene glycols, block copolymers of polyethylene and polypropylene gylcol, polytetramethylene glycols, etc.; neopentyl glycol, polyhydric alcohols having three or more hydroxy groups, such as 1,1,1-trimethylol ethane, 1,1,1-trimethylol propane, pentaerythritol, sorbitol, reaction products of the aforesaid polyhydric alcohols having a functionality of three or more with alkylene oxides (ethylene oxide or propylene oxide such as those sold for use in the production of flexible polyurethane foams, etc. In general, the polyhydric alcohols having a functionality of three or more should provide no more than about 2 mole % of the polyester. For optimum properties, it is generally preferred that either ethylene glycol or butylene glycol comprise approximately 100 mole % of the polyol portion of the copolyester of this invention since, as pointed out above, the large volume polyesters of commerce are the polyethylene terephthalates and the polybutylene terepthalates.

Broadly speaking, the polyesters of this invention can be made by reacting polyhydric alcohol with the appropriate polycarboxylic acid or lower alkyl (preferably methyl) ester of the polycarboxylic acid. In those cases where the polyester is composed of essentially one dihydric alcohol (ethylene glycol or butylene glycol) and the two essential dicarboxylic acid monomers (terephthalic acid and tetramethyl biphenyl dicarboxylic acid) these polyesters can be produced by reacting dihydric alcohol with one or more of the acids or their ester forming derivatives. Alternatively, one of the acid monomers can be reacted with dihydric alcohol and then the second acid monomer condensed. If desired, block copolymers can be produced by reacting each acid separately with one or more dihydric alcohols and then the resultant separate block copolymers condensed with each other. The dihydric alcohol component can comprise a plurality of dihydric alcohols, two or more being selected from the group consisting of ethylene glycol, propylene glycol, etc.

The polyhydric alcohol dicarboxylate copolyester can be prepared directly from a plurality of dicarboxylic acids, or an ester-forming derivative of the dicarboxylic acid or acids may be used, i.e., an acid halide, a salt, its anhydride, and/or an ester thereof, particularly an ester of the dicarboxylic acid with a lower aliphatic alcohol or with phenol. Correspondingly, a plurality of ester-forming derivatives of polyhydric alcohols can be employed, i.e., a derivative of the alcohol containing functional groups equivalent to the hydroxyl groups in their ability to react with carboxyl groups. Thus, an alcohol can be employed in the form of an epoxide, and/or ester of the alcohol with acetic acid or other lower aliphatic acid may be used.

A convenient method for preparing the polyesters of this invention comprises reacting dimethyl ester of the dicarboxylic acid or acid with an excess of the polyhydric alcohol, approximately 1.1 to 2.5 moles of alcohol per mole of ester, preferably about 1.5 to 2.1 moles of alcohol per mole of ester. For example, ester interchange reactions can be carried out at atmospheric pressure but higher or lower pressure may be used if desired. A range is usually from 0.1 to ten atmospheres. Temperature range is usually from 90° C to 325° C. Following the ester interchange reaction, in which methanol is removed as a by-product, heating is continued at an increased temperature to bring about polycondensation. Small amounts of catalysts are usually added to facilitate the reaction, manganous acetate, calcium acetate, and sodium methoxide being typical ester interchange catalysts and antimony trioxide, dibutyltin maleate, and zinc acetate being suitable polycondensation catalysts. Litharge, sodium hydrogen hexabutoxytitanate and the tetra-alkyl titanates, such as tetra-isopropyl titanate, are examples of catalysts which can be used for both the ester interchange and the polycondensation steps. Normally, the polycondensation reaction is continued until a degree of polymerization is achieved corresponding to an inherent viscosity of approximately at least 0.20 dl/g in a 60/40 phenol-tetrachloroethane solvent at 30° C.

To achieve a higher degree of polymerization, the product of the polycondensation reaction is allowed to cool to room temperature, about 20° to 25° C, forming a solid material. The solid is ground to flake, following which the flake is heated below its melting point in a stream of inert gas to achieve solid phase polycondensation.

Copolyesters of this invention have a range of utility according to the mole of ratios of the monomers. Copolyester films and molded parts based on ethylene glycol of mole ratios from 19:1 to 4:1 of ethylene terephthalate moieties and ethylene tetramethylbiphenyl dicarboxylate moieties can be used for hot-filled packaging applications because the Tg of these films and molded parts range upward from about 78° C to 95° C. Poly(ethylene terephthalate) film has a Tg of about 74° C (165° F) which restricts its use in hot-filling. A series of copolyesters of this invention of mole ratios 19:1 to 3:2 of ethylene terephthalate moities to ethylene tetramethylbiphenyl dicarboxylate moieties can be used in thermal applications where poly(ethylene 2,6-naphthalate) with a Tg of about 115° C has been required. The Tg of such a series, 19:1 to 3:2, ranges upward from about 78° C to about 119° C. One such application where the mole ratio is three ethylene terephthalate moieties to two ethylene tetramethylbiphenyl dicarboxylate moieties, or 3:2, where the Tg is about 115° C, is in truck tire cord. Truck tires have not been fabricated from polyester cords since the heat buildup in the tires raises the temperature of the tire cord above 75° C and the tire cord loses strength as it stretches. A series of copolyesters of this invention of mole ratios of 19:1 to 2:3 of ethylene terephthalate moieties to ethylene tetramethylbiphenyl dicarboxylate moieties can be used in thermal applications where polycarbonates with a Tg of about 145° to 148° C have been required. The Tg of such a series, 19:1 to 2:3, ranges upward from about 78° C to about 145° C. A series of copolyesters of this invention of mole ratios of 19:1 to 1:4 of ethylene terephthalate moieties of ethylene tetramethylbiphenyl dicarboxylate moieties can be used in thermal applications where polyarylates with a Tg of about 173° C have been required. The Tg of such a series, 19:1 to 1:4, ranges upward from about 78° C to about 169° C. One such application where the mole ratio is 1:4 is in molding medium to high-temperature electrical components with thermal properties engineered to desired requirements. Further, the new copolyesters have good resistance to hydrocarbon and aromatic solvents, are colorless (white), have the ability to be drawn into fibers from the melt, and have a broad softening temperature above the glass transition temperature which allows molding and fabrication.

In the following example parts and percentages are by weight unless otherwise indicated.

EXAMPLE

This example illustrates the production of polyester containing 2,2',6,6'-tetramethylbiphenyl-4,4'-dicarboxylate moieties, terephthalate moieties and glycol moieties. 3.1 Grams (0.016 moles) dimethyl terephthalate (DMT) mixed with 1.3 grams (0.004 mole) dimethyl 2,2',6,6'-tetramethylbiphenyl-4,4'-dicarboxylate ($M_2DMe$), 2.8 grams (0.044 mole) ethylene glycol, 0.05 grams zinc acetate and 0.05 grams calcium acetate were heated at 160° C for 120 minutes in a test tube equipped with a nitrogen bubbler and a side-arm. During the heating, nitrogen was passed slowly through the mixture. After two hours the temperature was raised to 210° C and 0.05 ml antimony trisbutoxide was added. A partial vacuum was pulled on the mixture over a period of 10 to 15 minutes, using a vacuum pump attached to the side-arm. The temperature was raised to 275° C. When this temperature was reached, full vacuum (0.9 mm Hg) was applied and the reaction continued for 133 minutes. 3.8 Grams of low molecular weight polymer were obtained. It had an inherent viscosity of 0.29 deciliters per gram (dl/g), as determined in a 60/40 phenol-tetrachloroethane mixed solvent at 30° C.

Copolyesters of ethylene terephthalate (ET) and ethylene 2,2',6,6'-tetramethylbiphenyl-4,4'-dicarboxylate ($M_2D$) in mole ratios 3:2, 2:3, and 1:4 were perpared in the same apparatus by the same procedure. The results are set forth below in Table I.

Table I

| Properties of the Copolyesters | | | | |
|---|---|---|---|---|
| Composition | Molar Ratio | I.V. dl/g | Tg °C | Molding Temperature °C |
| ET/$M_2$D | 1/0 | 0.60 | 74 | 275 |
| ET/$M_2$D | 4/1 | 0.29 | 95 | 140 |
| ET/$M_2$D | 3/2 | 0.31 | 119 | 140 |
| ET/$M_2$D | 2/3 | 0.55 | 145 | 185 |

Table I-continued

| Properties of the Copolyesters | | | | |
|---|---|---|---|---|
| Composition | Molar Ratio | I.V. dl/g | Tg °C | Molding Temperature °C |
| ET/$M_2$D | 1.4 | 0.40 | 169 | 210 |
| ET/$M_2$D | 0/1 | 0.64 | 191 | 240 |

The above data indicate that as the concentration of terephthalate moieties to tetramethylbiphenyl dicarboxylate moieties decreases from a molar ratio of 4/1 to 1/4, the molding temperature of the polymer increases. As the concentration of the tetramethylbiphenyl dicarboxylate moieties increases, the Tg of the polymer increases. A 19:1 mole ratio terephthalate to tetramethylbiphenyl dicarboxylate polyester having an I.V. of 0.63 dl/g has a Tg of 78° C and falls on the same line.

The 3/2 molar ratio ET/$M_2D$, based on 60% DMT and 40% $M_2DMe$, was further polymerized using a solid state polymerization procedure. A small sample of the 3/2 ET/$M_2D$ copolyester was ground to No. 10 mesh using a laboratory grinder. The sample was then heated in a test tube at 210° C and 0.25 mm Hg vacuum for 16 hours. The resulting polymer had a inherent viscosity of 0.35 dl/g.

When the ethylene glycol in the 4:1 mole ratio terephthalate to tetramethylbiphenyl dicarboxylate polyester was replaced with tetramethylene glycol and the polyester was prepared in the same way, a polyester was produced having an I.V. of 0.53 dl/g, a Tg of 52°–54° C and a melting temperature of 173°–179° C. In this case also the Tg of the copolyester falls on the linear line connecting the Tg points of homopolyesters of polytetramethylene terephthalate and polytetramethylene-2,2',6,6'-tetramethylbiphenyl-4,4'-dicarboxylate.

I claim:

1. A high molecular weight polyester comprising a polyhydroxy component and polycarboxylic acid component wherein said dicarboxylate component comprises terephthalate moieties and 2,2',6,6'-tetramethylbiphenyl-4,4'-dicarboxylate moieties in a range of mole ratios of from 19:1 to 1:19.

2. The polyester of claim 1 wherein said polyester is essentially linear and said polyhydroxy component comprises alkylene glycol moieties containing 2 to 12 carbon atoms.

3. The polyester of claim 2 wherein said polyhydroxy component comprises ethylene glycol moeties.

4. The polyester of claim 3 wherein the said range of said dicarboxylate components comprises the series of mole ratios, terephthalate moieties to 2,2',6,6'-tetramethylbiphenyl-4,4'-dicarboxylate moieties, of from 19:1 to 4:1.

5. The polyester of claim 3 wherein the said range of said dicarboxylate components comprises the series of mole ratios, terephthalate moieties to 2,2',6,6'-tetramethylbiphenyl-4,4'-dicarboxylate moieties, of from 19:1 to 3:2.

6. The polyester of claim 3 wherein the said range of said dicarboxylate components comprises the series of mole ratios, terephthalate moieties to 2,2',6,6'-tetramethylbiphenyl-4,4'-dicarboxylate moieties of from 19:1 to 2:3.

7. The polyester of claim 3 wherein the said range of said dicarboxylate components comprises the series of the mole ratios, terephthalate moieties to 2,2',6,6'-tetramethylbiphenyl-4,4'-dicarboxylate moieties, of from 19:1 to 1:4.

8. The polyester of claim 2 wherein said polyhydroxy component comprises butylene glycol moieties.

* * * * *

UNITED STATES PATENT OFFICE
CERTIFICATE OF CORRECTION

Patent No. 4,035,342            Dated July 12, 1977

Inventor(s) Edward E. Paschke

It is certified that error appears in the above-identified patent and that said Letters Patent are hereby corrected as shown below:

In the Patent:

Col.1, line 55 reads "of" should read --or-- per application page 2, line 19.

Col.1, line 67 reads "polyethylene bottles" should read --polyethylene terephthalate bottles-- per application page 2, line 28.

Col.2, line 38 reads "then homopolyester" should read --than homopolyesters-- per application page 3, line 30.

Col.3, line 30 reads "dimethylol cycloaliphatic glycols such as 1,4-dimethylol cyclohexane, dimethylol cyclobutane" should read --dimethylol cyclobutane-- per application page 5, line 16.

Col.3, line 41 reads "oxide" should read --oxide)-- per application page 5, line 23.

Signed and Sealed this

Eighth Day of November 1977

[SEAL]

Attest:

RUTH C. MASON  
Attesting Officer

LUTRELLE F. PARKER  
Acting Commissioner of Patents and Trademarks